Aug. 8, 1961 H. L. DANIELS 2,995,632

VARIABLE AREA TRANSDUCERS

Filed June 28, 1956

INVENTOR
HOWARD L. DANIELS

BY Cushman, Darby & Cushman
ATTORNEYS

United States Patent Office 2,995,632

Patented Aug. 8, 1961

2,995,632

VARIABLE AREA TRANSDUCERS

Howard L. Daniels, St. Paul, Minn., assignor to Sperry Rand Corporation, New York, N.Y., a corporation of Delaware Filed June 28, 1956, Ser. No. 594,645
3 Claims. (Cl. 179—100.2)

This invention relates to variable area type magnetic recording transducers constructed to minimize non-linear distortion.

In United States Patent No. 2,743,320, granted April 24, 1956, to Sidney M. Rubens and me, there are described and claimed apparatus and systems for recording magnetic flux patterns on a magnetizable member moved relative to transducing apparatus. Certain embodiments of that apparatus involve the application of different states of magnetization on either side of a flux reversal boundary formed between areas of differing magnetization, the boundary being caused to be transversely displaced on the member along its length in response to intelligence to be recorded. Playback may be effected by detecting the excursions of the boundary by a suitable pickup device, which in one form may be a conventional electromagnetic reading unit for use with magnetic tape. My copending application Serial No. 310,070, filed September 17, 1952, describes improvements to this type of transducing apparatus and system.

The invention described herein constitutes improvements upon the boundary displacement recording technique disclosed in the above mentioned patent and application. The present invention particularly pertains to means for reducing the non-linear distortion encountered under non-contact conditions, and under contact recording as well insofar as distortion may be there encountered. Non-linear distortion of the character just mentioned is due mainly to the fact that a sharp and precise boundary between regions of oppositely polarized saturation on the magnetic record is difficult to obtain, particularly in non-contact recording under practical conditions. While it is theoretically possible to sharply delineate the oppositely polarized regions on the magnetic record, in practice there are factors which limit and control the degree of boundary definition. These factors include the character of the electronic driving power available and the saturation of the ferromagnetic members of the recording head structure.

It is, therefore, an object of this invention to provide in a variable area magnetic recording transducer a means of reducing to a minimum the non-linear distortion encountered as during non-contact recording operations.

It is a further object of this invention to provide in a variable area magnetic recording transducing head a means of varying the cross-section of at least one of the pole pieces which define the recording gap.

Another object of this invention is to provide in a variable area magnetic transducer a means of varying the transverse permeability of the high reluctance pole piece which defines the recording gap.

Other objects and advantages of the invention, which include specific arrangements for accomplishing the above, will be apparent from the following specification and claims and accompanying drawings.

Illustrative embodiments of the invention may be best understood with reference to the accompanying drawings, wherein.

Figures 1, 2, 3, 4, 5, 6, 7, 8, 9, 10, 11, 12, 13, 14:
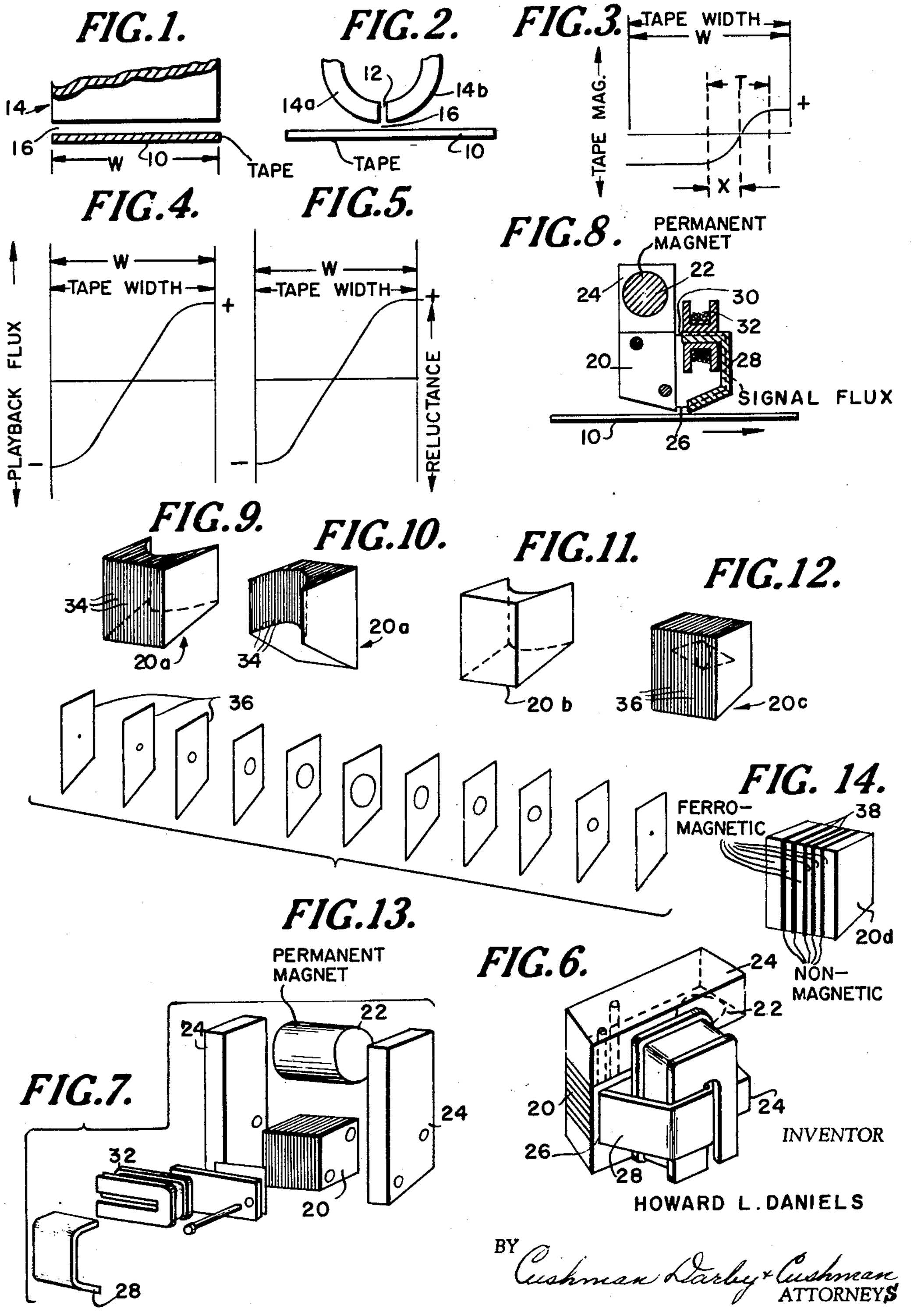
FIGURE 1 represents a cross-sectional view of a typical magnetic recording track and partial outline of a transducer.
FIGURE 2 shows a side view of the FIGURE 1 arrangement.
FIGURE 3 shows a typical distribution of flux recorded in a record member such as that of FIGURE 1.
FIGURE 4 shows a typical plot of playback flux widthwise of the record linking a reading transducer.
FIGURE 5 shows graphically a distribution of reluctance widthwise of the record in a recording transducer according to this invention to correct for non-linear distortion.
FIGURE 6 is a perspective view of a representative variable area recording transducer.
FIGURE 7 is an exploded view of the structure shown in FIGURE 6.
FIGURE 8 is a sectional side view of the structure of FIGURE 6.
FIGURE 9 shows one embodiment in perspective of a feautre of the present invention.
FIGURE 10 shows a rear view of the construction of FIGURE 9.
FIGURE 11 shows in perspective another embodiment of a feature of the present invention.
FIGURE 12 shows in perspective still another embodiment of a feature of the present invention.
FIGURE 13 is an exploded view of the structure of FIGURE 12.
FIGURE 14 shows a still further embodiment of a feature of the invention.

Referring to FIGURE 1, numeral 10 designates a magnetic recording member or track thereof of width W. In a typical case the recording track may be comprised of a red oxide material about one mil thick located one to two mils from the areas of transducer pole pieces which define a recording gap 12. In FIGURE 1 reference character 14 generally designates the transducer, and 16 designates the clearance of the gap 12 from the record. FIGURE 2 shows a side view, the pole pieces being here designated 14*a* and 14*b*. In both figures, the gap and clearance are exaggerated for clarity.

FIGURE 3 represents a typical plot of residual magnetization of the medium across the track after recording. For typical non-contact clearances 16 the boundary between areas of oppositely polarized magnetization may be slightly less than half of the track width. That is to say, if the track width W is ¼ inch, the boundary may be about $\frac{3}{32}$ inch in width. The boundary area is shown of width T and the center of the boundary is shown displaced a distance X from the center of the track. It will be understood from the above mentioned patent and application and from what is said hereinafter that the boundary is shiftable to alter X in accordance with a signal being recorded. Those skilled in the art will perceive that the flux linking a conventional reading transducer during playback is proportional to the difference between the positive and negative areas of the remanent induction curve of FIGURE 3. So long as the sides of the boundary are contained within the record the flux linking the playback will be a linear function of the distance X. The flattened regions of FIGURE 3 are due to saturation of the record. When a side of the boundary reaches an edge of the record, it can be seen that the identity between positive and negative areas of polarization will no longer exist and non-linear distortion will result. This concept is graphically illustrated in FIGURE 4, showing the resultant playback flux as a function of position of X across the gap and across the record. In this figure the droop of the extremes of the curve represent departures from a linear relationship. In accordance with the present invention such non-linear distortion may be substantially if not entirely eliminated by causing the reluctance per unit length along at least one pole piece to vary as a function of transverse position of each unit length. Proper arrangement of this parameter compensates for the drooping characteristic of the playback curve and virtually eliminates non-linear distortion.

FIGURE 5 illustrates, in graphic form, the manner in which said transverse reluctance per unit length should vary along the length of the gap to correct for the non-linear portions of the curve of FIGURE 4. If the transverse reluctance varies according to FIGURE 5, the rate of shift of the boundary per unit change in signal current is increased as the boundary is displaced from the center. The direction of this increase in the rate of shift of the boundary is such that it opposes and counteracts the distortion due to non-linearity. In any given case, the reluctance characteristic when diagramed as per FIGURE 5 should be matched to the playback flux characteristic as per FIGURE 4.

FIGURES 6–8 show various views of one embodiment of a boundary displacement recording transducer head wherein separate sources of bias flux and signal flux are provided. This is a preferred embodiment, and fully explained in aforementioned patent application Serial No. 310,070. Briefly stated for present purposes, what may be conveniently termed a bias field is derived from the transverse magnetomotive drop across a series of stacked laminae 20, the planes of the laminae being parallel to the direction of motion of the record. This stack makes up a pole analogous to 14a or 14b of FIGURE 2. The source of bias flux may be a permanent magnet 22 coupled to the ends of stack 20 by highly permeable yokes 24. A gap 26, like gap 12 of FIGURE 2, is formed by one edge of the lamination stack 20 in conjunction with the mating edge of a homogeneously permeable signal flux member 28 (preferably of relatively low reluctance), whose section is in the form of a trapezoid open on one side (FIGURE 8). An unused gap 30 is also preferably provided. Because of the uniform reluctance of the gaps separating the signal flux member 28 from the lamination stack 20, the member 28 adopts a magnetic potential midway between the potentials at the extreme of the stack 20.

For non-contact recording, a space or clearance like clearance 16 of FIGURES 1 and 2 of 0.001 inch or more is ordinarily maintained between the lower surface of the members defining gap 26 and record 10; in this case, a non-magnetic shim of 0.003 to 0.005 inch thickness may be inserted in gap 26 without serious loss of high-frequency response. A relatively large gap in this case considerably relieves the burden on the bias magnet 22 in producing a bias field in the record medium which can over-saturate same. In operation, stack 20 presents such reluctance to flux from magnet 22 that leakage flux from stack 20 will proceed in one direction at one end of gap 26 and will proceed in the opposite direction at the other end, with a falling-off in flux intensity to a reversal point midway between the ends of the gap when no signal current flows through a signal current coil 32. When a signal current is applied an additional flux, substantially uniform over the length of the gap, will in effect add to or subtract from the bias flux to thus cause the boundary to shift in relation to signal strength. It will be understood that laminated stack 20 has relatively high reluctance in a transverse direction, whereas the reluctance through the stack is low.

FIGURES 9 and 10 show front and rear views, respectively, of a technique that may be used to vary the reluctance of the pole piece formed by stack 20 of the embodiment of FIGURES 6–8 as a function of transverse position. As shown, the laminations 34 making up a modified stack 20a may be graduated in size so that those near the center of the stack are progressively smaller than those at the extreme edges, thus progressively reducing the cross-sectional area of the stack. The laminations 34 may be cut to varying size and then assembled, or the assembled stack may be ground out or filed to its proper shape. The edge of the stack facing the recording gap must be left straight if, as in the usual case, the gap is to be straight.

The contour of the assembled stack 20a is an example of tailoring the transverse reluctance per unit length (FIGURE 5) to the playback flux (FIGURE 4) where a conventional playback transducer is to be used.

In the recording head is equipped with a high reluctance pole piece of homogeneous material, instead of a series of laminations, the pole piece itself may be formed in such a shape as to cause the cross-sectional area to increase as a function of its transverse distance from the center of the pole piece. This is set out in FIGURE 11, which shows a pole piece 20b of compressed powdered iron, which could have, for example, a permeability of 25.

FIGURES 12 and 13 illustrate another means of varying the reluctance of a laminated pole piece 20c. In this method, the various laminae 36 are provided with apertures of varying sizes, the largest one being in the center lamina. It can be seen that this embodiment is easy to construct and lends itself readily to conventional production techniques.

The embodiment of FIGURE 14 employs the same basic concept, i.e., the varying of the transverse reluctance inversely with respect to the distance of each given lamina from the edge of the pole piece or stack. Here a stack 20d of laminae is used with low permeability spacers 38 of varying thickness interspersed between the individual laminae. The thickness of spacers 38, which may be of brass or paper, depend upon their distance from the center of the stack. As an example, the spacers 38 in the center two-thirds of the stack may be roughly 2 mils thick while those in the outer one-third may be approximately one mil in thickness. This variation of thickness in the low permeability spacers will cause the transverse reluctance to vary in accordance with the desired result as explained hereinabove.

From the foreging it will be clear that there is provided by the present invention an improved transducer for carrying out variable area recording. Since many additional embodiments of the invention will occur to others upon reading this specification, it is intended that all matter contained in the above description or shown in the accompanying drawings shall be interpreted as illustrative and not in a limiting sense. The true scope of the invention is to be determined from the appended claims.

What is claimed is:

1. In a magnetic recording system having a recording transducer which includes pole piece means spaced apart in a gap width dimension for defining a recording gap therebetween, the length of said pole piece means and gap being substantially the width of a record member to be recorded upon, means for causing a reversal of bridging flux at a point along the length of said gap, the just mentioned means including means for impressing an magnetomotive force across the ends of at least one of said pole piece means tending to pass magnetic flux through the length of said pole piece means, and means for varying the said reversal point along the length of the gap in accordance with a signal to be recorded; the improvement which comprises said one of said pole piece means to which said magnetomotive force is applied being constructed to have discrete incremental lengths of said pole piece means present differing reluctance to flux arising from said magnetomotive force from point to point along the length of said gap with greatest reluctance presented by a discrete incremental length positioned centrally of the length of the gap, and decreasing reluctance presented by discrete incremental lengths positioned progressively outwardly of the gap length toward the ends thereof so as to cause said flux reversal point to shift outwardly from the center of the gap at an increasing rate per unit of signal increase as the reversal point approaches an end of the gap, the arrangement being such that during playback non-linear response due to a recorded flux reversal boundary of finite width moving into interception of the edge of the record is compensated.

2. A system as in claim 1 wherein said pole piece means to which said magnetomotive force is impressed being constructed to be of decreasing cross-sectional area from the ends toward the lengthwise center thereof according to a predetermined relationship so that during playback non-linear response due to a recorded flux reversal boundary of finite width moving into interception of the edge of the record is compensated.

3. A system as in claim 1 wherein said pole piece means to which said magnetomotive force is impressed comprises a stack of laminae of magnetic material with low permeability spacers interspersed between at least the laminae located toward the center of the pole piece so as to provide a predetermined relationship between the permeability characteristics of the laminae and spacers as a function of the distance thereof from the ends toward the center of the gap so that during playback non-linear response due to a recorded flux reversal boundary of finite width moving into interception the edge of the record is compensated.

References Cited in the file of this patent

UNITED STATES PATENTS

| | | |
|---|---|---|
| 2,469,266 | Howell | May 3, 1949 |
| 2,594,414 | Garreau | Apr. 29, 1952 |
| 2,615,990 | Blaney et al. | Oct. 28, 1952 |
| 2,641,656 | Dicke | June 9, 1953 |
| 2,743,320 | Daniel et al. | Apr. 24, 1956 |
| 2,806,904 | Atkinson et al. | Sept. 17, 1957 |